March 5, 1963  P. H. FOWLER ETAL  3,079,786
SHOCK PULSE GENERATORS
Filed Feb. 8, 1960
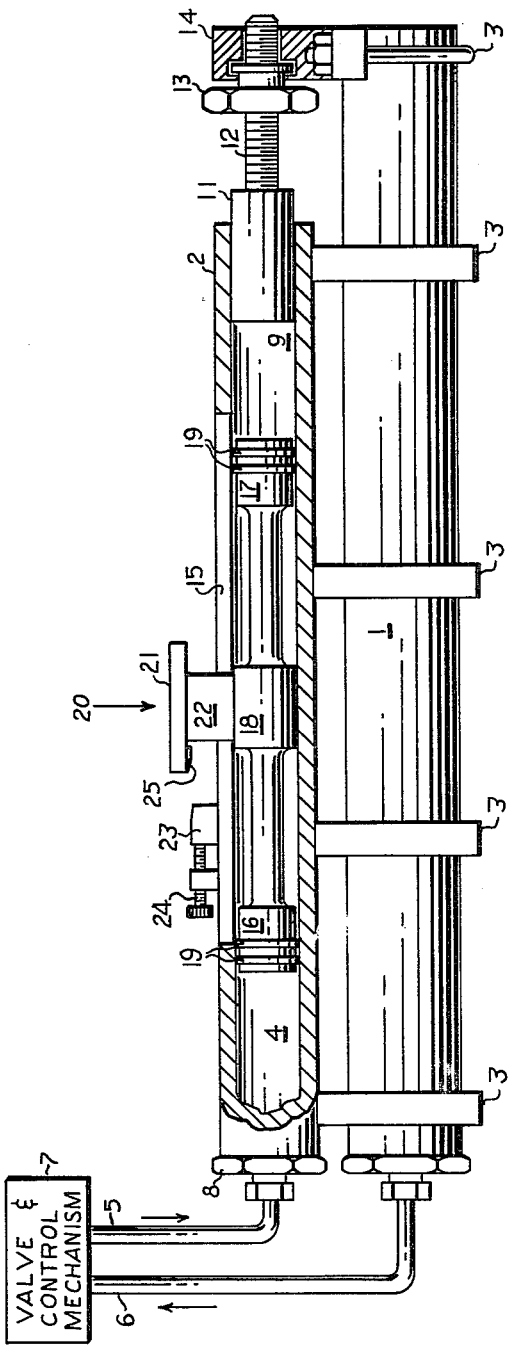
INVENTORS
PETER H. FOWLER
AUSTIN H. KING
BY H. Vincent Harsha
ATTORNEY and 3,079,786
Patented Mar. 5, 1963

3,079,786
SHOCK PULSE GENERATORS
Peter H. Fowler, Watertown, and Austin H. King, Pepperell, Mass., assignors to Raytheon Company, Waltham, Mass., a corporation of Delaware
Filed Feb. 8, 1960, Ser. No. 7,473
7 Claims. (Cl. 73—12)

The present invention relates to shock pulse generators and more particularly to air driven one-half sine acceleration shock pulse generators.

Shock testing of many devices such as, for example, vacuum tubes, switches, electrical components, mechanical devices, and the like is necessary to determine their practical utility for various applications and uses. Although many low gravity or "low G" devices are available and operate satisfactorily, all high gravity or "high G" devices so far as we know are extremely bulky, expensive to manufacture and maintain, and are difficult to operate. The present invention was developed to provide at least a 150 G 30±1 millisecond, one-half sine shock pulse with velocity changes of up to about 120 feet per second (80 miles per hour). Of the many shock testing devices known to us only one is capable of meeting the above requirements. This device is subject to many serious disadvantages. For example, its cost, of the order of $26,000, is prohibitively high, and due to its great size, a heavy starting impulse of about 26,000 pounds is required. As a natural result, running and maintenance costs are high, the device cannot be test wired, and the safety factor during operation is low.

A further disadvantage of prior art devices is that those having a high G's (up to about 150 G's) have a short pulse duration (up to about 11 milliseconds) and those having a longer pulse duration have a low G's.

In accordance with the present invention, which is not subject to the disadvantages noted immediately hereinabove, in the preferred embodiment air from a suitable supply is admitted to one end of a cylinder closed at both ends and containing a free doubled ended piston. The cylinder is provided with a centrally located slot such that as the piston moves due to the aforementioned air pressure it releases this pressure from an expansion chamber. As the piston approaches the opposite closed end of the cylinder it seals a compression chamber the length of which is adjustable. The compression of the air in the compression chamber generates an approximately half-sine shock pulse and the piston rebounds at almost its original speed. The piston is then brought to rest by friction or by suitable braking means. A vacuum tube or other object to be tested is mounted on a platform affixed to the center portion of the piston through the aforementioned slot in the cylinder.

The foregoing and other objects, features, and advantages of the present invention will appear more fully hereinafter from the detailed description which follows taken together with the accompanying drawing which shows a specific embodiment of the invention by way of example. It is to be understood, however, that the drawing is for the purpose of illustration and description only and is not intended as a definition of the limits of the invention.

A suitable device for providing a high G one-half sine shock pulse in accordance with the invention is illustrated in its elementary form in the drawing and comprises a reservoir 1 fixedly attached to a cylinder 2 as by U clamps 3. The reservoir 1 may be charged in conventional manner to the desired pressure, such as, for example, 20 to 60 pounds per square inch from factory air lines or any suitable supply (not shown). Air pressure is admitted to a closed expansion chamber 4 of the cylinder 2 by air lines 5—6 connected respectively to the cylinder 2 and the reservoir 1. Suitable and conventional valve and control means 7 such as a solenoid operated valve for admitting air pressure in such amounts and at and for such times as may be desired from the reservoir to the expansion chamber 4 is interposed between and connected to air lines 5 and 6. The expansion chamber 4 of the cylinder may be sealably closed at one end by a removable nut 8, whereas the compression or rebound chamber 9 may be sealably closed by an adjustable plug 11. Plug 11 is provided with an externally threaded extension 12 which is threadably engaged with an internally threaded nut 13 rotatably carried in an end support 14. Inspection will show that rotation of nut 13 will vary the length and volume of the rebound chamber 9. The cylinder 2 is provided with a narrow centrally located slot 15. Slidably carried in cylinder 2 is member 20, the only moving element of the invention. The member 20 is comprised of oppositely disposed pistons 16—17 fixedly connected to a center stabilizing bearing 18 having an outside diameter slightly less than the inside diameter of the cylinder 2. Pistons 16—17 are provided with rings 19 of such diameter and of such material as to provide a seal when each piston enters its respective chamber. Platform 21 of any suitable configuration to which the device to be tested may be attached is fixedly connected to the bearing 18 through slot 15 by a support 22. The length of slot 15 and member 20 is selected such that chamber 4 is exposed to atmospheric pressure by piston 16 at or after the time piston 17 enters and seals compression chamber 9. Although various and suitable braking mechanisms may be utilized to arrest the return movement of member 20, a friction brake is shown by way of example as comprising a longitudinally adjustable cam 23 adapted for gradual engagement with a surface 25 of the platform 21. A brake adjusting screw 24 permits longitudinal adjustment of the cam 23. Inasmuch as it is only necessary that the element 20 be restrained from movement toward chamber 9 a second time after actuation of the pulse generator it is to be understood that the invention is not limited to the brake construction shown and described since any number of any equivalent and suitable braking means will occur to those skilled in the art and may be used. Further, if sufficient friction is built into the pulse generator, which effect can be easily achieved, the brake is not necessary and can be omitted.

For a piston travel of about 29 inches, a maximum acceleration of about 450 G's, and a maximum duration of about 40 milliseconds, compressed air in the range of up to about 60 pounds per square inch is required depending on the required velocity. Since the maximum acceleration generated by the compressed air acting on the piston is only about a tenth of the required shock acceleration, the air pressure does not appreciably affect or vary measured test results.

The pulse generator operates in the following manner. Assuming the moving element is in its normal or extreme left position actuation of the valve and control mechanism 7 applies pressure for the desired length of time sufficient to cause the member 20 to accelerate toward chamber 9 at the desired rate and to obtain maximum velocity prior to or at the instant piston 17 closes chamber 9, at or before which time chamber 4 is exposed to atmospheric pressure. Due to the compression of the air trapped in chamber 9 by piston 17 of member 20, a shock pulse of approximately one-quarter sine shape is generated and the member 20 rebounds at almost its original speed to provide a total shock pulse of approximately one-half sine shape. The member 20 is thereafter arrested by the combined action of air trapped in chamber 4 by piston 16 and cam 23 or friction as the case may be.

It will be obvious to those skilled in the art that the air pressure, dimensions of the cylinder 2, and member 20 may be selected to satisfy a wide diversity of conditions or requirements. Further, explosive pressure may be utilized instead of air pressure and, if desired, the shape of the shock pulse may be varied within wide limits by making the plug or counter piston 11 elastic, providing selectable openings along the length of the cylinder and/or chambers, and, of course, by adjustment of the longitudinal position of the plug 11.

While the present invention has been described in its preferred embodiment, it is realized that modifications may be made, and it is desired that it be understood that no limitations on the invention are intended other than may be imposed by the scope of the appended claims.

What is claimed is:

1. A shock pulse generator comprising: a hollow cylinder closed at both ends and having a longitudinal slot in a side wall of the cylinder, the slot having its ends terminating in spaced relation to the closed ends of the cylinder; a member having a piston at each end slidably carried in said cylinder the over-all length of the member and pistons being less than the length of the cylinder, each piston being slidably sealed to the inner walls of the cylinder; support means fixedly attached to said member and extending outwardly through said slot for receiving an object to be tested; and means connected to one end of said cylinder for causing said member to accelerate toward the opposite end of said cylinder.

2. A shock pulse generator comprising: a hollow cylinder closed at both ends and having a longitudinal slot in a side wall of the cylinder, the slot having its ends terminating in spaced relation to the closed ends of the cylinder; a member having a piston at each end slidably carried in said cylinder, the over-all length of said member and said pistons being less than the length of said slot, each said piston providing a seal when in circumferential contact with said cylinder; support means fixedly attached to said member and extending outwardly through said slot for receiving an object to be tested; and means connected to one end of said cylinder for imparting an impulse to said member when in circumferential contact with said one end whereby said member is caused to accelerate toward the opposite end of said cylinder.

3. A shock pulse generator comprising: a hollow cylinder closed at one end and having a longitudinal slot in a side wall of the cylinder, the slot having its ends terminating in spaced relation to the closed ends of the cylinder; means closing the other end of said cylinder for adjustably varying the effective length of said cylinder; a member having a piston at each end slidably carried in said cylinder the over-all length of the member and pistons being less than the length of the cylinder, each piston being slidably sealed to the inner walls of the cylinder; support means fixedly attached to said member and extending outwardly through said slot for receiving an object to be tested; and means connected to one end of said cylinder for imparting an impulse to said member whereby said member is caused to accelerate from said one end toward the opposite end of said cylinder.

4. A shock pulse generator comprising: a hollow cylinder closed at both ends and having a longitudinal slot in a side wall of the cylinder, the slot having its ends terminating in spaced relation to the closed ends of the cylinder; a member having a piston at each end slidably carried in said cylinder, the over-all length of said member and said pistons being less than the length of said slot, each said piston providing a seal when in circumferential contact with said cylinder; support means fixedly attached to said member and extending outwardly through said slot for receiving an object to be tested; means connected to one end of said cylinder for imparting an impulse to said piston when in circumferential contact with said one end whereby said member is caused to accelerate toward the opposite end of said cylinder; and means for substantially preventing said member from traveling toward said opposite end of said cylinder a second time after application of said impulse.

5. A shock pulse generator comprising: a hollow cylinder closed at both ends and having a longitudinal slot in a side wall of the cylinder, the slot having its ends terminating in spaced relation to the closed ends of the cylinder; means closing the other end of said cylinder for adjustably varying the effective length of said cylinder; a member having a piston at each end slidably carried in said cylinder, the over-all length of said member and said pistons being less than the length of said slot, each said piston providing a seal when in circumferential contact with said cylinder; support means fixedly attached to said member and extending outwardly through said slot for receiving an object to be tested; means connected to one end of said cylinder for imparting an impulse to said member when in circumferential contact with said one end whereby said member is caused to accelerate toward the opposite end of said cylinder; and means for substantially preventing said member from traveling toward said opposite end of said cylinder a second time after application of said impulse.

6. In a shock pulse genertaor the combination comprising: a cylinder sealably closed at one end and having a centrally located longitudinal slot separating an expansion chamber at said one end and a compression chamber at the other end of the cylinder; a longitudinally adjustable plug sealably closing said other end of the cylinder; a first piston longitudinally movable into and out of said expansion chamber and in sealing contact therewith when located therein; a second piston longitudinally movable into and out of said compression chamber and in sealing contact therewith when located therein; means fixedly connecting said pistons one to another in spaced relationship whereby the extreme end surfaces of said pistons are spaced apart a distance less than that of said slot; support means fixedly attached to said connecting means intermediate said pistons and extending outwardly through said slot for receiving an object to be tested; means for applying a compressed gas to said expansion chamber to impart an impulse to said first piston when disposed in said expansion chamber whereby said pistons are caused to accelerate toward the said other end of the cylinder thereby respectively opening said expansion chamber to atmospheric pressure and trapping air in said compression chamber as said first piston leaves said expansion chamber and said second piston enters said compression chamber; and means for substantially preventing said pistons from traveling toward said other end of the cylinder a second time after application of said impulse.

7. A shock pulse generator comprising a hollow body having longitudinally extending side walls and opposed end walls enclosing a chamber, a slot in a side wall and extending longitudinally of the body, said slot having its ends terminating in spaced relation to said opposed end walls, a reciprocal member slidably located within the chamber and movable longitudinally therein, the member having a piston at each end, the over-all length of said member and pistons being shorter than the length of the slot, support means fixed to the member and extending outwardly of the cylinder through the slot, and means at one end of the chamber for impelling the member toward the opposite end of the chamber, said pistons being respectively slidably sealed to the inner surfaces of said side walls.

References Cited in the file of this patent

UNITED STATES PATENTS

| 2,390,966 | Scott | Dec. 11, 1945 |
| 2,611,355 | Ashwood | Sept. 23, 1952 |
| 2,669,972 | Cross | Feb. 23, 1954 |
| 2,931,218 | Ottestad | Apr. 5, 1960 |